United States Patent Office 3,499,894
Patented Mar. 10, 1970

3,499,894
SUBSTITUTED 3,4 - DIHYDRO - 2H - (1)-BENZOTHI-ENO - (3,2-b) - PYRAN-2-YL-AMINE COMPOUNDS AND METHOD OF PREPARATION THEREOF
Earl R. Bockstahler, Acton, Ind., assignor to The Dow Chemical Company, Midland, Mich., a corporation of Delaware
No Drawing. Filed Aug. 3, 1966, Ser. No. 569,837
Int. Cl. C07d 87/46, 29/34, 63/18
U.S. Cl. 260—247.1                                                                6 Claims

ABSTRACT OF THE DISCLOSURE

Substituted 3,4 - dihydro - 2H - (1) - benzothieno - (3, 2-b)-pyran-2-yl-amine compounds, such as 1-(7-chloro-3-ethyl - 3,4 - dihydro - 4 - propyl - 2H - (1) - benzothieno (3,2-b)-pyran-2-yl)-piperidine and 4-(4-ethyl-3,4-dihydro-3 - methyl - 2H - (1) - benzothieno(3,2 - b) - pyran - 2-yl)morpholine, are prepared by the reaction of a substituted benzo(b)-thiophen-3-(2H)-one with an aliphatic aldehyde and an amine. The compounds are useful as pesticides for the control of insects, plants, bacteria and fungi.

The present invention is directed to novel substituted 3,4 - dihydro - 2H - (1) - benzothieno(3,2-b) - pyran - 2-yl-amine compounds corresponding to the formula:

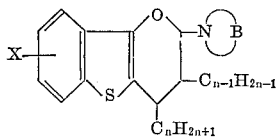

In the present specification and claims $n$ is an integer from 2 to 5 inclusive, X represents a member of the group consisting of hydrogen, chlorine and bromine atoms, and $\widehat{\text{N B}}$ represents a member of the group consisting of morpholine, piperidine, pyrrolidine and dialkyl amine groups wherein alkyl represents an alkyl radical having from 1, to 2, to 3, to 4 carbon atoms.

The compounds of the present invention are white crystalline solids which are slightly soluble in water and ethanol. These compounds are soluble in dilute acid, but are slowly decomposed thereby to form a resinous precipitate. The compounds have been found useful as pesticides for the control of insects, plants, bacteria and fungi, including such representative organisms as mites, water plants, *Bacillus subtilis* and *Rhizopus nigricans*.

The new compounds of the present invention are prepared by reacting an aliphatic aldehyde having from 3 to 6 carbon atoms, inclusive, and a secondary amine such as morpholine, piperidine, pyrrolidine or a dialkylamine with a benzo(b)thiophenone corresponding to the formula:

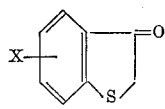

The reaction is carried out in the presence of an inert organic solvent as reaction medium and proceeds readily at room temperature with the generation of heat. The proportions of the reactants to be employed are not critical, some of the desired product being obtained when combining the reactants in any proportions. However, the reaction consumes 2 moles of aldehyde and one mole of amine for each mole of benzothiophenone employed and the use of the reactants in such proportions is preferred.

In carrying out the preparation of the benzothienopyranylamines of the invention, the reactants and the inert reaction medium are contacted together in any order or fashion. Representative inert organic liquid reaction media include methanol, ethanol, isopropanol, ether, methylene chloride and benzene. In a convenient procedure, the reactants are added to the reaction medium which is allowed to stand at room temperature. The benzothienopyranylamine product precipitates from the reaction medium as a solid material and can be separated by such conventional procedures as filtration, decantation or centrifugation. The product separated as described above may be employed in pesticidal applications or further purified by such conventional techniques as washing or recrystallization.

Representative substituted benzothiophenones employed as starting materials for preparing the compounds of the invention include 4-chloro-benzo(b)thiophen-3-(2H)-one, 5 - bromo - benzo(b)thiophen - 3 -(2H) - one, 6 - bromo-benzo(b)thiophen - 3 - (2H) - one and 7 - chloro - benzo(b)thiophen-3-(2H)-one.

The following examples illustrates the invention.

EXAMPLE 1

Propionaldehyde (4 grams) was added to a solution of 5 grams of benzo(b)thiophen-3-(2H)-one and 2.75 grams of piperidine in 25 milliliters of 95 percent ethanol. The solution, which warmed spontaneously, was allowed to stand at room temperature for an hour, during which time a crystalline solid precipitated. The solid was separated by filtration and recrystallized from isopropanol, yielding 1 - (4 - ethyl - 3,4 - dihydro - 3 - methyl - 2H - (1) - benzothieno(3,2-b) - pyran - 2 - yl)piperidine as a light pink crystalline solid (melting point 114°–115° C.). The structure of the product was confirmed by infrared spectroscopy and by proton nuclear magnetic resonance analysis.

In substantially the same procedure 1-(3-butyl-3,4-dihydro - 4 - pentyl - 2H - (1) - benzothieno(3,2-b) - pyran-2-yl)pyrrolidine, having a molecular weight of 385, is prepared by reacting one molar proportion of benzo(b) thiophen-3-(2H)-one with two molar proportions of hexanal and one molar proportion of pyrrolidine.

EXAMPLE 2

In substantially the same procedure as in Example 1, 4.95 grams of butyraldehyde was added to a solution of 5 grams of benzo(b)thiophen - 3 - (2H) - one and 2.75 grams of piperidine in 25 milliliters of 95 percent ethanol and the precipitated product recrystallized to obtain 1 - (3 - ethyl - 3,4 - dihydro - 4 - propyl - 2H - (1)-benzothieno(3,2-b)-pyran-2-yl)piperidine as a white crystalline solid (melting point 71°–72° C.).

EXAMPLE 3

In substantially the same procedure as in the preceding examples, 4 grams of propionaldehyde was added to a solution of 5 grams of benzo(b)thiophen-3-(2H)-one and 3 grams of morpholine in 25 milliliters of 95 percent ethanol to obtain 4-(4-ethyl-3,4-dihydro-3-methyl-2H-(1)-benzothieno(3,2-b) - pyran - 2 - yl)morpholine as a white crystalline solid melting point 176°–177.5° C.).

EXAMPLE 4

6.15 grams of 6-chloro-benzo(b)thiophen-3-(2H)-one was added to a solution of 4.8 grams of butyraldehyde and 2.8 grams of piperidine in 200 milliliters of denatured alcohol. After about 30 minutes at room temperature, a solid began to precipitate from the reaction mixture. When precipitation had substantially stopped, the solid was collected by filtration and crystallized from methanol to give 1 - (7 - chloro - 3 - ethyl-3,4-dihydro-4-propyl - 2H - (1)-benzo-thieno(3,2-b)-pyran-2-yl)piperidine as a white crystalline solid (melting point 79°–81 C.).

In substantially the same procedure, the following benzothienopyranylamines of the present invention are produced:

N - (4 - butyl - 8 - chloro - 3,4 - dihydro - 3 - propyl-2H - (1) - benzothieno(3,2-b)-pyran-2-yl)dimethylamine having a molecular weight of 366.5, by reacting one molar proportion of 7 - chloro - benzo(b)thiophen - 3 - (2H)-one with two molar proportions of valeraldehyde and one molar proportion of dimethylamine;

N - (5 - chloro - 3 - butyl - 3,4 - dihydro - 4 - pentyl-2H-(1)-benzothieno(3,2-b)-pyran-2-yl)dibutylamine, having a molecular weight of 478.5, by reacting one molar proportion of 4 - chloro - benzo(b)thiophen - 3 - (2H)-one with two molar proportions of hexanal and one molar proportion of dibutylamine;

N - (6 - bromo - 4 - butyl - 3,4 - dihydro - 3 - propyl-2H - (1) - benzothieno(3,2-b) - pyran - 2 - yl - dipropylamine, having a molecular weight of 467, by reacting one molar proportion of 5-bromo-benzo(b)thiophen-3-(2H)-one with two molar proportions of valeraldehyde and one molar proportion of dipropylamine; and 1 - (4 - butyl - 6 - chloro - 3,4 - dihydro - 3 - propyl-2H - (1) - benzothieno(3,2-b)-pyran-2-yl)pyrrolidine, having a molecular weight of 389.5, by reacting one molar proportion of 5 - chloro - benzo(b)thiophen - 3 - (2H)-one with two molar proportions of valeraldehyde and one molar proportion of pyrrolidine.

The compounds of the present invention can be employed as the sole toxicant in pesticides for the control of various pests such as insects, plants, bacteria and fungi.

For such uses, the compounds can be employed in an unmodified form or dispersed on a finely divided solid and employed as dusts. Such mixtures also can be dispersed in water with or without the aid of a surface active agent, and the resulting aqueous suspensions employed as sprays. In other procedures, the products are employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The toxicant compounds of the present invention and the compositions containing these compounds are introduced into the various environments by such conventional techniques as spraying, dusting and drenching. The exact concentration of the novel compounds to be employed in the treating compositions is not critical and may vary considerably provided the required amount of effective agent is supplied on the plant, plant part and the aqueous environment, and so forth.

In representative operations, 100 percent kill of fanwort and moneywort was obtained when 1-(3-ethyl-3,4-dihydro - 4 - propyl-2H-(1)-benzothieno(3,2-b)-pyran-2-yl)-piperidine was added to the water plants' aqueous environment as the sole toxicant and in an amount sufficient to provide the toxicant compound at a concentration of 20 parts per million by weight. In other operations, aqueous compositions containing 4-(4-ethyl-3,4-dihydro-3-methyl-2H-(1)-benzothieno(3,2-b)-pyran - 2 - yl)morpholine as the sole toxicant at a concentration of 1000 parts per million by weight gave substantially complete kills of two-spotted spider mites, *Tetranychus bimaculatus*, when applied to the mite-infested plants. In other operations, the growth of each of the organisms *Bacillus subtilis, Staphylococcus aureus, Candida pelliculosa, Pullularia pullulans* and *Rhizopus nigricans* was completely inhibited when 1-(4-ethyl - 3,4 - dihydro - 3 - methyl - 2H - (1) - benzothieno-(3,2-b)-pyran-2-yl)piperidine was added to the culture medium as the sole toxicant and in an amount sufficient to provide the toxicant compound at a concentration of 0.1 percent by weight. In other operations, aqueous compositions containing 1-(7-chloro-3-ethyl-3,4-dihydro-4-propyl - 2H - (1)-benzothieno(3,2-b)-pyran-2-yl)piperidine as the sole toxicant at a concentration of 20 parts per million by weight gave substantially complete inhibition of rice blast organism. In other operations, aqueous compositions containing 1 - (3 - ethyl - 3,4 - dihydro - 4-propyl - 2H - (1) - benzothieno - (3,2-b) - pyran - 2 - yl) piperidine as the sole toxicant at a concentration of 100 parts per million by weight gave substantially complete inhibition of fire blight bacterium. In other operations, aqueous compositions containing 1-(7-chloro-3-ethyl-3,4-dihydro-4-propyl-2H-(1)-benzothieno - (3,2-b) - pyran-2-yl)piperidine as the sole toxicant at a concentration of 100 parts per million gave substantially complete inhibition of *Trichophyton mentagrophytes*.

I claim:

1. A substituted 3,4-dihydro-2H-(1)-benzothieno(3,2-b)-pyran-2-yl-amine compound corresponding to the formula

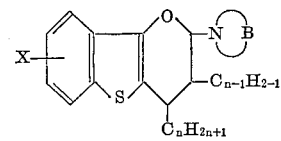

wherein $n$ is an integer from 2 to 5 inclusive, X represents a member of the group consisting of hydrogen, chlorine and bromine atoms and

represents a member of the group consisting of morpholine, piperidine, pyrrolidine and dialkyl amine groups in which alkyl represents an alkyl radical having from 1 to 4 carbon atoms.

2. The substituted pyranylamine compound of claim 1 wherein the compound is 1-(3-ethyl-3,4-dihydro-4-propyl-2H-(1)-benzothieno(3,2-b)-pyran-2-yl)piperidine.

3. The substituted pyranylamine compound of claim 1 wherein the compound is 1-(4-ethyl-3,4-dihydro-3-methyl-2H-(1)-benzothieno(3,2-b)-pyran-2-yl)-piperidine.

4. The substituted pyranylamine compound of claim 1 wherein the compound is 1-(7-chloro-3-ethyl-3,4-dihydro - 4 - propyl-2H-(1)-benzothieno(3,2-b)-pyran-2-yl)-piperidine.

5. The substituted pyranylamine compound of claim 1 wherein the compound is 4-(4-ethyl-3,4-dihydro-3-methyl - 2H-(1)-benzothieno(3,2-b)-pyran-2-yl)morpholine.

6. A process for the preparation of a substituted 3,4-dihydro - 2H - (1)-benzothieno(3,2-b)-pyran-2-yl-amine compound corresponding to the formula

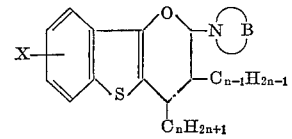

wherein $n$ is an integer from 2 to 5 inclusive, X represents a member of the group consisting of hydrogen, chlorine and bromine atoms and

represents a member of the group consisting of morpholine, piperidine, pyrrolidine and dialkyl amine groups in which alkyl represents an alkyl radical having from 1 to 4 carbon atoms, which comprises contacting a substituted benzo(b)thiophen-3-(2H)-one and an amine selected from the group consisting of morpholine, pyrrolidine, piperidine and dialkylamines in which alkyl represents an alkyl group having from 1 to 4 carbon atoms, inclusive, with an aliphatic aldehyde of the formula $$C_nH_{2n+1}CHO$$

wherein $n$ is an integer from 2 to 5 inclusive, for a period of time sufficient to prepare the corresponding substituted 3,4 - dihydro-2H-(1)benzothieno(3,2-b)pyran-2-yl-amine, and recovering the substituted 3,4-dihydro-2H-(1)benzothieno(3,2-b)-pyran-2-yl-amine from the reaction mixture.

References Cited

UNITED STATES PATENTS 3,408,353  10/1968  Jucker et al. _____ 260—293

ALEX MAZEL, Primary Examiner

R. V. RUSH, Assistant Examiner

U.S. Cl. X.R.

71—91; 260—293.4, 326.5, 330.5; 424—248, 267, 274, 275